(12) United States Patent
Kawaguchi

(10) Patent No.: US 9,529,340 B2
(45) Date of Patent: Dec. 27, 2016

(54) ROBOT APPARATUS, CONTROLLING METHOD OF ROBOT APPARATUS, PROGRAM AND RECORDING MEDIUM

(71) Applicant: CANON KABUSHIKI KAISHA, Tokyo (JP)

(72) Inventor: Yohei Kawaguchi, Ushiku (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/629,026

(22) Filed: Feb. 23, 2015

(65) Prior Publication Data

US 2015/0248116 A1 Sep. 3, 2015

(30) Foreign Application Priority Data

Mar. 3, 2014 (JP) .................... 2014-040404

(51) Int. Cl.
*G05B 11/01* (2006.01)
*B25J 9/16* (2006.01)

(52) U.S. Cl.
CPC .............. *G05B 11/01* (2013.01); *B25J 9/1687* (2013.01); *G05B 2219/39241* (2013.01); *G05B 2219/40223* (2013.01); *Y10T 29/53078* (2015.01)

(58) Field of Classification Search
CPC .............. G05B 11/01; G05B 2219/39001; G05B 2219/39241; G05B 2219/41156; G05B 2219/41229; G05B 2219/49314; G05B 2219/40035; G05B 2219/39133; G05B 2219/39473; G05B 2219/39478; G05B 2219/39519; G05B 2219/39568; B25J 9/01; B25J 9/1612; B25J 9/1633; B25J 9/1687; B25J 13/08–13/085; B25J 15/00; B25J 15/0033; B25J 15/08–15/12; B23P 19/02

See application file for complete search history.

(56) References Cited

FOREIGN PATENT DOCUMENTS

| JP | 04-322994 A | 11/1992 |
|----|-------------|---------|
| JP | 4793694 A | 10/2011 |

*Primary Examiner* — James Trammell
*Assistant Examiner* — Adam Mott
(74) *Attorney, Agent, or Firm* — Fitzpatrick, Cella, Harper & Scinto

(57) ABSTRACT

A poor fit state is eliminated during an inserting operation for inserting the inserting object piece to the inserting target piece. Vibrators are attached to fingers of a robot hand, at positions contacting an inserting object piece. A controlling apparatus controls a power source to start vibrating the vibrators before the start of the inserting operation and judges as to whether a detection value of force in a Z direction detected by a force sensor exceeds or falls below a threshold value during the inserting operation. When the controlling apparatus judges that the detection value of force in the Z direction detected by the force sensor exceeds the threshold value during the inserting operation, the controlling apparatus controls the power source to change the amplitudes, the frequencies and the phases of vibrations of the vibrators.

28 Claims, 7 Drawing Sheets

ROBOT APPARATUS, CONTROLLING METHOD OF ROBOT APPARATUS, PROGRAM AND RECORDING MEDIUM

BACKGROUND OF THE INVENTION

Field of the Invention

The present invention relates to a robot apparatus that performs an inserting operation of inserting an inserting object piece to an inserting target piece, a controlling method of the robot apparatus, a program and a recording medium.

Description of the Related Art

A compliance control using a force sensor is generally performed when a robot apparatus is used to carry out an operation of assembling pieces together involving contact of the pieces, specifically, an inserting operation of inserting an inserting object piece to an inserting target piece. The compliance control is a control of providing a virtual spring property and viscosity to a robot arm with respect to force (including force and moment of force) applied to a robot hand grasping an inserting object piece to make the robot arm flexible with respect to reaction force. The compliance control allows carrying out the inserting operation by correcting a positioning error of the robot arm, a position error of the inserting target piece and grasping reproducibility of the robot hand. However, if there is a poor fit during the insertion, stronger reaction force is necessary to eliminate this state, and the force may exceed the allowable power of the force sensor. Therefore, eliminating the poor fit only under the compliance control is difficult.

Methods of using vibration to eliminate a poor fit of an inserting object piece during an inserting operation are disclosed in Japanese Patent No. 4793694 and Japanese Patent Application Laid-Open No. H04-322994. In Japanese Patent No. 4793694, when it is judged that there is a poor fit during an inserting operation under force control, a feedback target value of the force control is periodically changed to provide vibration force to eliminate the poor fit. In Japanese Patent Application Laid-Open No. H04-322994, a vibrator including a cut and a piezoelectric element is attached to a base part of a hand, and vibration of the vibrator applies vibration to the hand to thereby eliminate the poor fit.

However, since the force control is used to provide vibration to the inserting object piece in Japanese Patent No. 4793694, the frequency of the provided vibration is limited by the response frequency of the force control and the eigenvalue of the robot arm, and the poor fit of the inserting object piece may not be eliminated. Meanwhile, the vibrator is used to apply vibration to the inserting target piece in Japanese Patent Application Laid-Open No. H04-322994. However, the entire hand with a large mass is excited by the vibrator in Japanese Patent Application Laid-Open No. H04-322994, and the vibration tends to attenuate. Therefore, the vibration cannot be efficiently provided to the inserting object piece, and the poor fit of the inserting object piece may not be eliminated.

An object of the present invention is to eliminate a poor fit state when an inserting object piece poorly fits to an inserting target piece.

SUMMARY OF THE INVENTION

According to an aspect of the present invention, a robot apparatus comprises: a robot arm; a robot hand having a plurality of fingers for grasping a inserting object piece and being attached to the robot arm; a force sensor configured to detect a force exerted on the robot hand in a inserting direction to insert the inserting object piece to a inserting target piece; a vibrator attached to two or more of the plurality of fingers, at a position so as to contact the inserting object piece; a driving source configured to vibrate each of the vibrators; and a controlling unit configured to control the robot arm and the robot hand, and to control the driving source, wherein the controlling unit controls the driving source, to perform a inserting operation and to start a vibration of each of the vibrators, and judges as to whether a detecting value by the force sensor exceeds a threshold value or falls below the threshold value, and, when the controlling unit judges the detecting value by the force sensor exceeds the threshold value during the inserting operation, the controlling unit controls the driving source, to change at least one of an amplitude, a frequency and a phase of the vibration of at least one of the vibrators.

According to a further aspect of the present invention, a controlling method of a robot apparatus, wherein the robot apparatus comprises: a robot arm; a robot hand having a plurality of fingers for grasping a inserting object piece and being attached to the robot arm; a force sensor configured to detect a force exerted on the robot hand in a inserting direction to insert the inserting object piece to a inserting target piece; a vibrator attached to two or more of the plurality of fingers, at a position so as to contact the inserting object piece; a driving source configured to vibrate each of the vibrators; and a controlling unit configured to control the robot arm and the robot hand, and to control the driving source, wherein the controlling method comprises: starting vibration controlling, by the controlling unit, to control the driving source, to perform a inserting operation and to start a vibration of each of the vibrators, judging, by the controlling unit, as to whether a detecting value by the force sensor exceeds a threshold value or falls below the threshold value, and, changing, by the controlling unit, such that, when the controlling unit judges the detecting value by the force sensor exceeds the threshold value during the inserting operation, the controlling unit controls the driving source, to change at least one of an amplitude, a frequency and a phase of the vibration of at least one of the vibrators.

Further features of the present invention will become apparent from the following description of exemplary embodiments with reference to the attached drawings.

DESCRIPTION OF THE EMBODIMENTS

Preferred Embodiments of the Present Invention will now be described in detail in accordance with the accompanying drawings.

[First Embodiment]

Figure 1:
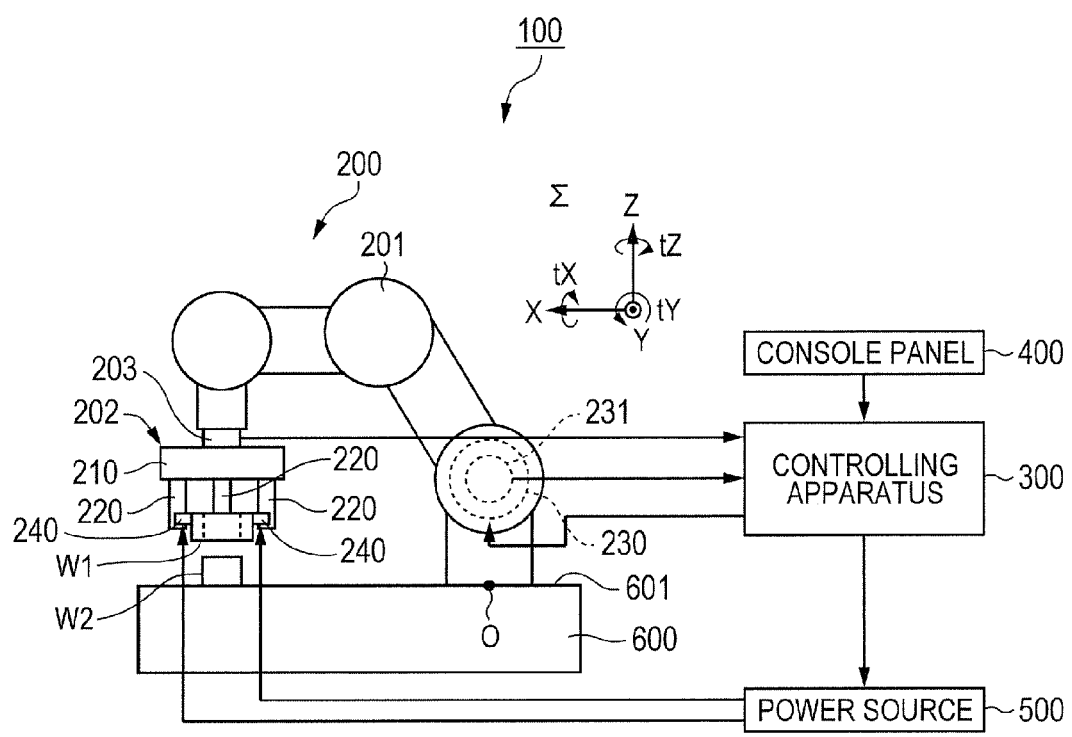
FIG. 1 is a schematic diagram illustrating a schematic configuration of a robot apparatus according to a first embodiment.

FIG. 1 is a schematic diagram illustrating a schematic configuration of a robot apparatus according to a first embodiment of the present invention. A robot apparatus 100 is a production robot that performs an inserting operation of inserting an inserting object piece W1 to an inserting target piece W2. The robot apparatus 100 includes: a robot 200; a controlling apparatus 300 as a controlling unit that controls operation of the robot 200; and a console panel 400 as a teaching unit that teaches operation of the robot 200 by operation of a user. The robot 200 includes: a vertical multi-joint robot arm 201; and a robot hand 202 as an end effector attached to a tip of the robot arm 201. A base end of the robot arm 201 is fixed to an upper surface 601 of a stand 600. The inserting target piece W2 is mounted on the upper surface 601 of the stand 600.

A plurality of links, which can swing and rotate at joints, are connected to form the robot arm 201. The robot arm 201 includes: a rotational driving unit 230 attached to each joint to drive the link; and a rotary encoder (encoder) 231 that detects a rotation angle or a joint angle of the rotational driving unit 230. Although the rotational driving unit 230 and the encoder 231 are illustrated for only one joint in FIG. 1, the rotational driving unit 230 and the encoder 231 are similarly arranged on the other joints. The rotational driving unit 230 includes: a rotation motor that is an electric motor; and a decelerator that decelerates the rotation of the rotation motor.

The robot hand 202 is attached to a tip link of the robot arm 201. The robot hand 202 includes: a hand body 210; and a plurality of (three in the first embodiment) fingers 220 arranged on the hand body 210 in a manner that the fingers 220 can be opened and closed. The hand body 210 includes a driving unit not illustrated that drives the plurality of fingers 220. The inserting object piece W1 can be grasped by a closing operation of the plurality of fingers 220, and the grasping of the inserting object piece W1 can be released by an opening operation of the plurality of fingers 220.

The plurality of fingers 220 are arranged in a rotation symmetry at an angle (120° in the first embodiment) dividing 360° by the number of fingers around the central axis of the hand body 210. Although the fingers 220 are grasping nails without joints in the first embodiment, the fingers 220 may include joints. The inserting object piece W1 grasped by the plurality of fingers 220 is a cylindrical piece, and the inserting target piece W2 is a columnar piece.

A force sensor 203 as a force detection unit is attached to the tip of the robot arm 201, and the robot hand 202 is attached to the tip of the robot arm 201 through the force sensor 203. The force sensor 203 is configured to detect force (including moment) exerted on the robot hand 202 (i.e. the inserting object piece W1 grasped by the robot hand 202).

A position of an intersection of a rotation center of a first joint axis viewed from the installation surface of the robot arm 201 and the installation surface of the robot arm 201 is defined as a reference origin O of a robot coordinate system Σ. The robot coordinate system Σ is defined by an X axis in which the front direction of the robot arm 201 is positive, a Y axis in which the left direction of the robot arm 201 is positive, a Z axis in which the upper direction of the robot arm 201 is positive, and a tX axis, a tY axis and a tZ axis in which the clockwise rotations of the axes are positive.

The robot apparatus 100 includes: vibrators 240 as vibration bodies attached to two or more of the plurality of fingers 220, all of the fingers 220 in the first embodiment; and a power source 500 that is a driving source for vibrating the vibrators 240. The vibrators 240 are made of piezoelectric elements, fixed to the fingers 220, and connected to the power source 500 through power lines not illustrated. Although it is effective to expose the vibrators 240 to the outside, the arrangement is not limited to this. The vibration bodies may include the vibrators 240 and covering members (protection members) such as rubber for protecting the vibrators 240.

The controlling apparatus 300 is configured to control the operation of the robot arm 201 and the robot hand 202 and to control the drive of the power source 500 when the plurality of fingers 220 perform an inserting operation of grasping the inserting object piece W1 to insert the inserting object piece W1 to the inserting target piece W2.

Figure 2:
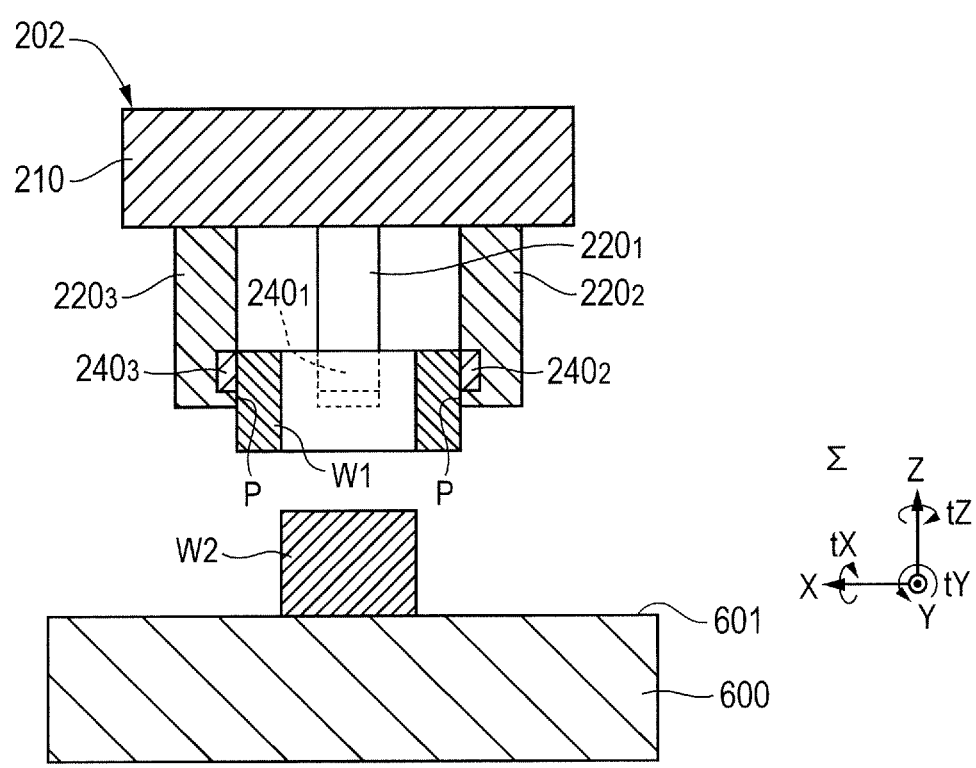
FIG. 2 is a cross-sectional schematic diagram illustrating a robot hand of the robot apparatus according to the first embodiment.

FIG. 2 is a cross-sectional schematic diagram illustrating the robot hand 202 of the robot apparatus 100 according to the first embodiment of the present invention. The three fingers 220 are indicated by fingers $220_1$, $220_2$ and $220_3$ here. The vibrator 240 attached to the finger $220_1$ is a vibrator $240_1$, the vibrator 240 attached to the finger $220_2$ is a vibrator $240_2$, and the vibrator 240 attached to the finger $220_3$ is a vibrator $240_3$. As illustrated in FIG. 2, the vibrators $240_1$ to $240_3$ are provided at positions contacting the grasped inserting object piece W1. Specifically, the vibrators $240_1$ to $240_3$ are provided at grasping positions (areas) P where the fingers $220_1$ to $220_3$ grasp the inserting object piece W1. Therefore, the vibrators $240_1$ to $240_3$ are arranged at positions where the fingers $220_1$ to $220_3$ contact the inserting object piece W1. In the first embodiment, the vibrators $240_1$ to $240_3$ are provided substantially at the tips of the fingers $220_1$ to $220_3$.

Figure 3:
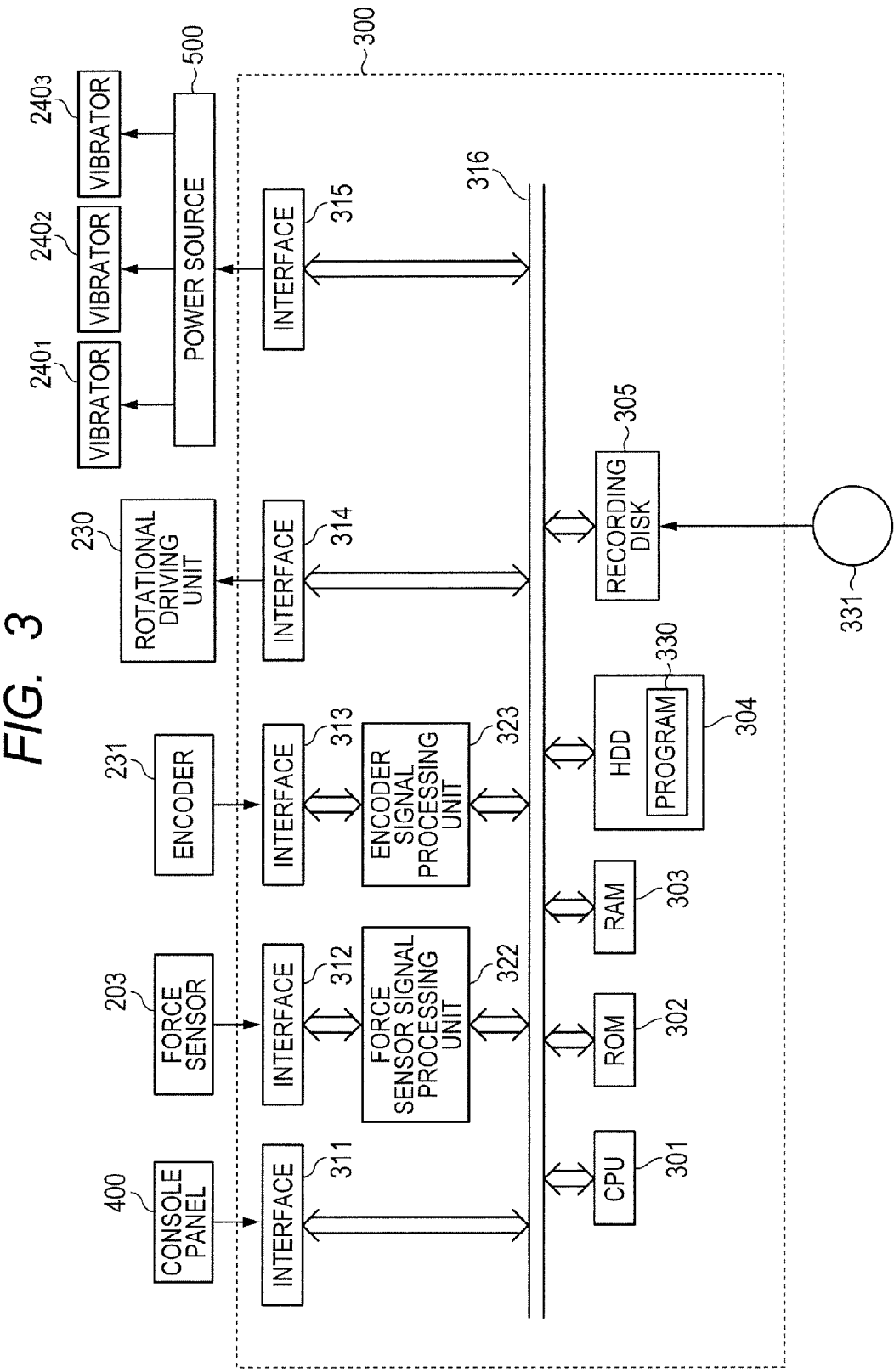
FIG. 3 is a block diagram illustrating a schematic configuration of a controlling apparatus of the robot apparatus according to the first embodiment.

FIG. 3 is a block diagram illustrating a schematic configuration of the controlling apparatus 300 of the robot apparatus 100 according to the first embodiment of the present invention. The controlling apparatus 300 is a computer and includes a CPU (Central Processing Unit) 301 as an operating unit. The controlling apparatus 300 also includes a ROM (Read Only Memory) 302, a RAM (Random Access Memory) 303 and an HDD (Hard Disk Drive) 304 as storing units. The controlling apparatus 300 also includes a recording disk drive 305 and various interfaces 311 to 315. The controlling apparatus 300 further includes a force sensor signal processing unit 322 and an encoder signal processing unit 323.

The ROM 302, the RAM 303, the HDD 304, the recording disk drive 305, the force sensor signal processing unit 322, the encoder signal processing unit 323 and various interfaces 311, 314 and 315 are connected to the CPU 301 through a bus 316. The interface 312 is connected to the force sensor signal processing unit 322, and the interface 313 is connected to the encoder signal processing unit 323.

A basic program, such as BIOS, is stored in the ROM 302. The RAM 303 is a storage device that temporarily stores various data such as arithmetic processing results of the CPU 301.

The HDD 304 is a storage device that stores arithmetic processing results of the CPU 301 and various data acquired from the outside and is configured to record a program 330 for causing the CPU 301 to execute various arithmetic operations described later. The CPU 301 executes the steps of a controlling method of the robot apparatus based on the program 330 recorded (stored) in the HDD 304.

The recording disk drive 305 can read various data and programs recorded in a recording disk 331.

The console panel 400 that is a teaching unit is portable and connected to the interface 311. The user operates the console panel 400 to output teaching points for teaching the robot 200, i.e. teaching points indicating target joint angles (angle command values) of the joints of the robot arm 201 and teaching points indicating target positions of the fingers 220 of the robot hand 202. The user can also operate the console panel 400 to create and edit an operation program.

The force sensor 203 is connected to the interface 312. The force sensor signal processing unit 322 calculates force received by the robot hand 202 (inserting object piece W1) based on a detection signal from the force sensor 203. Specifically, the force sensor signal processing unit 322 calculates force in an inserting direction (Z direction) to insert the inserting object piece W1 to the inserting target piece W2 and force in directions (X direction and Y direction) orthogonal to (crossing) the force in the inserting direction based on the detection signal from the force sensor 203.

The encoder 231 is connected to the interface 313. The encoder 231 outputs a pulse signal corresponding to the detected angle detection value. The encoder signal processing unit 323 receives the pulse signal from the encoder 231 and converts the pulse signal to angle information (data).

The rotational driving unit 230 is connected to the interface 314. Based on an operation command, the CPU 301 outputs signals of drive commands indicating the amount of control of the rotation angle of the rotational driving unit 230 to the rotational driving unit 230 at predetermined time intervals, through the bus 316 and the interface 314. The rotational driving unit 230 includes a driving circuit substrate not illustrated that receives the signals of the drive commands to supply current to a motor not illustrated.

The power source 500 is connected to the interface 315. The CPU 301 receives an operation command from the console panel 400 and transmits a drive command for driving the vibrators $240_1$, $240_2$ and $240_3$ to the power source 500 based on information from the force sensor signal processing unit 322 and the encoder signal processing unit 323. Based on the drive command of the CPU 301, the power source 500 supplies driving power with voltage waveforms at predetermined frequencies, predetermined amplitudes and predetermined phases to the vibrators $240_1$, $240_2$ and $240_3$.

An external storage device not illustrated, such as a rewritable non-volatile memory and an external HDD, may be connected to the bus 316 through an interface not illustrated.

Figure 4:
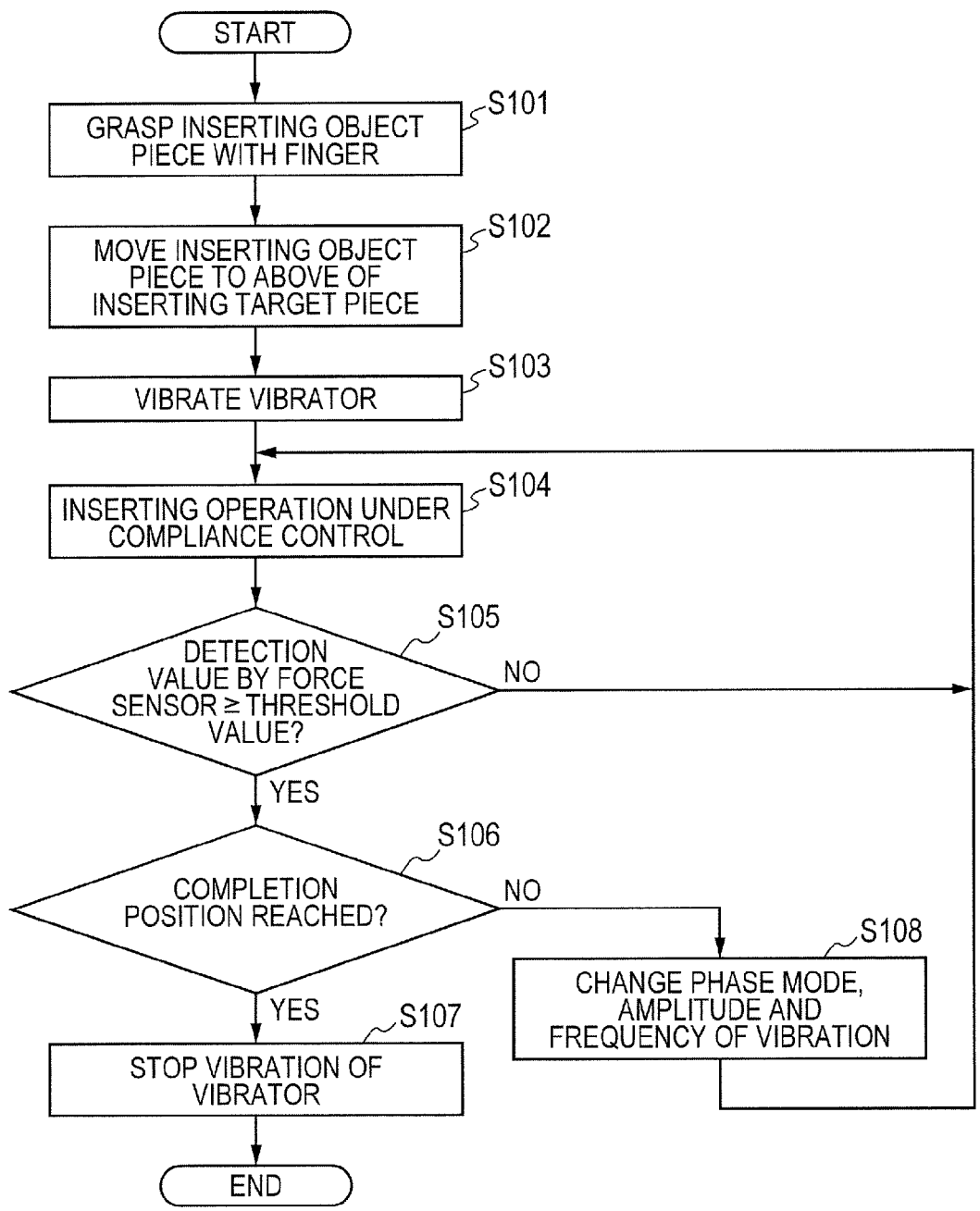
FIG. 4 is a flow chart illustrating a controlling method by the controlling apparatus of the robot apparatus according to the first embodiment.

Details of the controlling method of the robot apparatus 100 will be described. FIG. 4 is a flow chart illustrating the controlling method by the controlling apparatus 300 of the robot apparatus 100 according to the first embodiment of the present invention. The CPU 301 executes the steps illustrated in FIG. 4 according to the program 330.

The CPU 301 controls the drive of the fingers $220_1$ to $220_3$ of the robot hand 202 to cause the fingers $220_1$ to $220_3$ to grasp the inserting object piece W1 through the vibrators $240_1$ to $240_3$ (S101).

The CPU 301 controls the operation of the robot arm 201 to move the inserting object piece W1 grasped by the fingers $220_1$ to $220_3$ to above the inserting target piece W2 (S102).

The position above the inserting target piece W2 is a position taught in advance by using the console panel 400 or the like so that the center position deviation between the inserting object piece W1 and the inserting target piece W2 is 0.1 [mm] or less. A taper can be provided to one of the inner periphery of the inserting object piece W1 and the outer periphery of the inserting target piece W2 to correct the position under the compliance control when the center position deviation is equal to or smaller than the taper size.

The CPU 301 controls the power source 500 by transmitting a driving command to the power source 500 to start vibrating the vibrators $240_1$ to $240_3$ before the start (specifically, at the start) of the inserting operation. Therefore, the vibration can be started along with the execution of the inserting operation, i.e. during the execution of the inserting operation. For example, the vibration may be started at an early stage of the inserting operation. In this case, the vibration can be started at an early stage of a series of inserting steps in which coupling of the inserting object piece W1 and the inserting target piece W2 makes a transition (S103: vibration starting step). Based on the drive command from the CPU 301, the power source 500 applies periodically changing driving voltage waveforms to the vibrators $240_1$ to $240_3$ to vibrate the vibrators $240_1$ to $240_3$. As a result, the vibration is applied to the inserting object piece W1 when there is no poor fit.

Specifically, the power source 500 applies AC voltages necessary for vibration to the vibrators $240_1$ to $240_3$. Although the waveform of the AC voltage is a sine wave in the description of the first embodiment, the waveform is not limited to this, and the waveform can be a periodically changing waveform, such as a triangular wave and a trapezoidal wave. The amplitudes of the voltages applied to the vibrators $240_1$, $240_2$ and $240_3$ will be defined as $V_1$, $V_2$ and $V_3$, the frequencies of the voltages will be defined as $f_1$, $f_2$ and $f_3$, and the phases of the voltages will be defined as $\theta_1$, $\theta_2$ and $\theta_3$. A voltage $v_1(t)=V_1 \times \sin(2 \times \pi \times f_1 \times t - \theta_1)$ is applied to the vibrator $240_1$. A voltage $v_2(t)=V_2 \times \sin(2 \times \pi \times f_2 \times t - \theta_2)$ is applied to the vibrator $240_2$. A voltage $v_3(t)=V_3 \times \sin(2 \times \pi \times f_3 \times t - \theta_3)$ is applied to the vibrator $240_3$. Here, t denotes time. In this way, the vibrators $240_1$ to $240_3$ vibrate according to the voltages $v_1(t)$ to $v_3(t)$.

The amplitudes of the vibrations of the vibrators $240_1$, $240_2$ and $240_3$ will be defined as $V_{m1}$, $V_{m2}$ and $V_{m3}$, the frequencies of the vibrations will be defined as $f_{m1}$, $f_{m2}$ and $f_{m3}$, and the phases of the vibrations will be defined as $\theta_{m1}$, $\theta_{m2}$ and $\theta_{m3}$. A vibration $v_{m1}(t)$ of the vibrator $240_1$ is $v_{m1}(t)=V_{m1} \times \sin(2 \times \pi \times f_{m1} \times t - \theta_{m1})$. A vibration $V_{m2}(t)$ of the vibrator $240_2$ is $V_{m2}(t)=V_{m2} \times \sin(2 \times \pi \times f_{m2} \times t - \theta_{m2})$. A vibration $v_{m3}(t)$ of the vibrator $240_3$ is $V_{m3}(t)=V_{m3} \times \sin(2 \times \pi \times f_{m3} \times t - \theta_{m3})$. The amplitudes $V_{m1}$, $V_{m2}$ and $V_{m3}$ of the vibrations are proportional to the amplitudes of the voltages $V_1$, $V_2$ and $V_3$ of the voltages, the frequencies $f_{m1}$, $f_{m2}$ and $f_{m3}$ of the vibrations are equal to the frequencies $f_1$, $f_2$ and $f_3$ of the voltages, and the phases $\theta_{m1}$, $\theta_{m2}$ and $\theta_{m3}$ of the vibrations are equal to the phases $\theta_1$, $\theta_2$ and $\theta_3$ of the voltages. The waveforms of the vibrations of the vibrators $240_1$ to $240_3$ correspond to the waveforms of the voltages applied to the vibrators $240_1$ to $240_3$, and the amplitudes, the frequencies and the phases of the voltages can be controlled to control the amplitudes, the frequencies and the phases of the vibrations of the vibrators $240_1$ to $240_3$.

In this case, the frequencies $f_1$, $f_2$ and $f_3$ of the driving voltages provided to the vibrators $240_1$, $240_2$ and $240_3$ can be about 1 [kHz] to 10 [kHz] sufficiently larger than several dozen [Hz] that is a response frequency of the compliance control. In this way, the vibration force can be applied without affecting the compliance control carried out in the following steps. The vibration force is applied to the inserting object piece W1 by vibrating the vibrators $240_1$, $240_2$ and $240_3$.

Figure 5A:
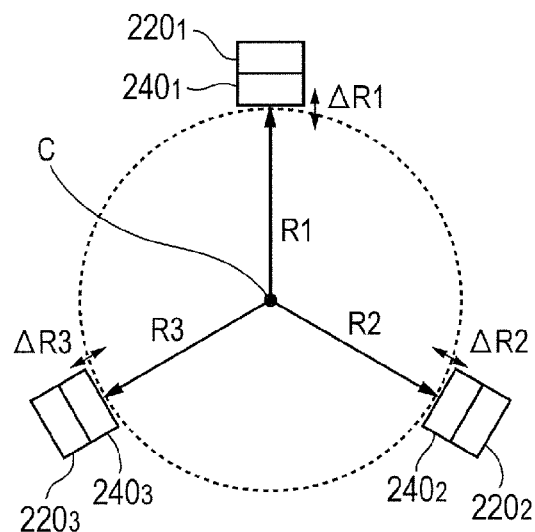
FIGS. 5A and 5B are diagrams for describing vibration of vibrators.
Figure 5B:
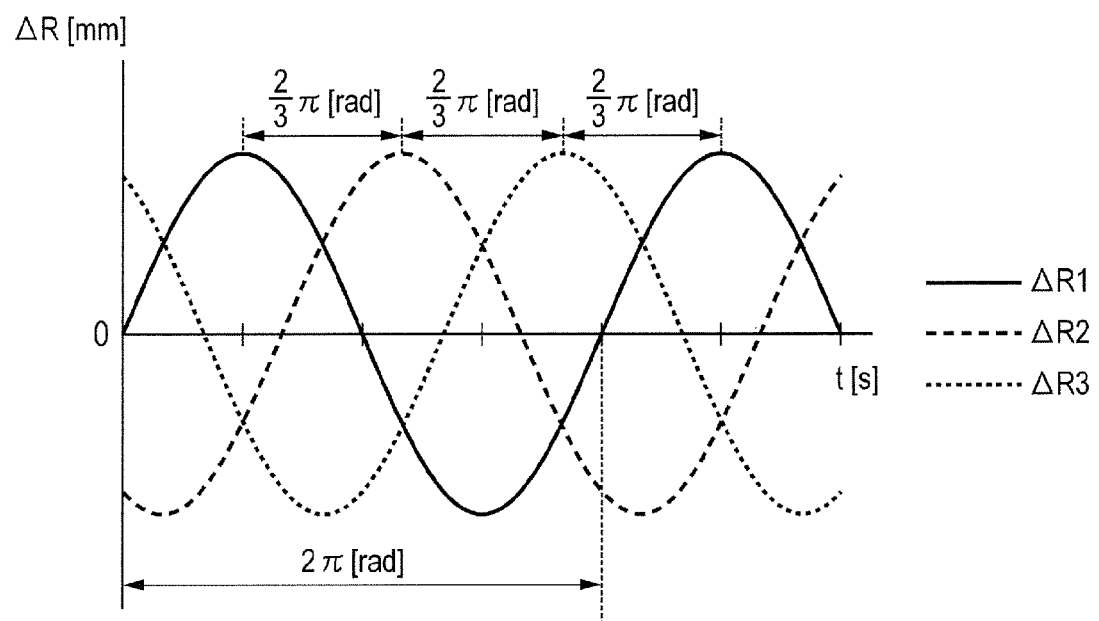

The voltages for vibrating the vibrators $240_1$, $240_2$ and $240_3$ are applied to the vibrators $240_1$, $240_2$ and $240_3$ so that the sum of the amounts of expansion and contraction becomes 0. This vibration method will be described with reference to FIGS. 5A and 5B. FIGS. 5A and 5B are diagrams for describing the vibration of the vibrators $240_1$, $240_2$ and $240_3$. FIG. 5A is a cross-sectional view of a state that the three fingers $220_1$, $220_2$ and $220_3$ grasp the inserting object piece W1 as seen from the attachment surface of the fingers $220_1$, $220_2$ and $220_3$ of the robot hand 202. FIG. 5B is a graph illustrating the amounts of expansion and contraction of the vibrators $240_1$, $240_2$ and $240_3$, wherein the vertical axis indicates an amount of expansion and contraction ΔR, and the horizontal axis indicates time t.

As illustrated in FIG. 5A, the fingers $220_1$, $220_2$ and $220_3$ are arranged in a rotation symmetry at 1200 around the axis line C of the hand body 210, and the fingers $220_1$, $220_2$ and $220_3$ can move in an opening direction away from the axis line C and a closing direction approaching the axis line C. The vibrators $240_1$, $240_2$ and $240_3$ are configured to vibrate in a direction (radial direction) of the axis line C. Three waveforms illustrated in FIG. 5B indicate changes in the amounts of expansion and contraction of the vibrators $240_1$, $240_2$ and $240_3$ in the radial direction. A solid line in FIG. 5B indicates an amount of expansion and contraction ΔR1 of the vibrator $240_1$ installed on the finger $220_1$. A broken line in FIG. 5B indicates an amount of expansion and contraction ΔR2 of the vibrator $240_2$ installed on the finger $220_2$. A dotted line in FIG. 5B indicates an amount of expansion and contraction ΔR3 of the vibrator $240_3$ installed on the finger $220_3$.

When the CPU 301 starts vibrating the vibrators $240_1$, $240_2$ and $240_3$ in step S103, the CPU 301 controls the power source 500 in a first phase mode such that the phases of the vibrations of the vibrators $240_1$, $240_2$ and $240_3$ have a phase difference acquired by equally dividing 360°. Sinusoidal AC voltages with 2π [rad] periods are shifted by 2π/3 [rad] for each of the vibrators $240_1$, $240_2$ and $240_3$ and applied to the vibrators $240_1$, $240_2$ and $240_3$.

Here, a phase mode of the AC voltages applied to the vibrators $240_1$, $240_2$ and $240_3$ is defined as $(\theta_1, \theta_2, \theta_3)$, and a phase mode of the vibrations of the vibrators $240_1$, $240_2$ and $240_3$ is defined as $(\theta_{m1}, \theta_{m2}, \theta_{m3})$. In the first embodiment, the phase mode $(\theta_1, \theta_2, \theta_3)$ of the voltages is set to the first phase mode (0°, 120°, 240°) to set the phase mode $(\theta_{m1}, \theta_{m2}, \theta_{m3})$ of the vibrations to the first phase mode (0°, 120°, 240°). In the first embodiment, the amplitudes of the voltages are set to $V_1=V_2=V_3$ to set the amplitudes of the vibrations to $V_{m1}=V_{m2}=V_{m3}$, and the frequencies of the voltages are set to $f_1=f_2=f_3$ to set the frequencies of the vibrations to $f_{m1}=f_{m2}=f_{m3}$. As a result, the sum ΔR1+ΔR2+ΔR3 of the amounts of expansion and contraction of the vibrators $240_1$, $240_2$ and $240_3$ that change according to the applied voltages is set to 0.

In this way, the phases of the vibrations are shifted in the vibrators $240_1$, $240_2$ and $240_3$, and the outside diameter of the circle passing through the tips of the vibrators $240_1$, $240_2$ and $240_3$ illustrated by a dotted line in FIG. 5A does not change. Therefore, the vibration force can be applied to the inserting objection piece W1 while maintaining constant grasping force applied to the inserting object piece W1. As a result, the robot hand 202 can move the inserting object piece W1 without the fingers $220_1$, $220_2$ and $220_3$ dropping the inserting object piece W1 and without a deviation of the position for grasping the inserting object piece W1 when the vibration is applied to the inserting object piece W1.

The CPU 301 then carries out an inserting operation (inserting action) under the compliance control (S104). The inserting operation is carried out while the vibrators $240_1$, $240_2$ and $240_3$ vibrate. As a result, the inserting operation can be carried out under a state that the occurrence of the poor fit between the inserting object piece W1 and the inserting target piece W2 is suppressed. The compliance control denotes feed-back control of the operation of the robot arm 201 to make smaller a force component in the directions (X direction and Y direction) crossing (orthogonal to) the inserting direction (Z direction) detected by the force sensor 203. The CPU 301 executes the compliance control during the inserting operation. The compliance control and the vibration of the vibrators $240_1$, $240_2$, and $240_3$ more effectively suppress the occurrence of a poor fit in the inserting operation.

The CPU 301 judges as to whether a detection value of force in the Z direction detected by the force sensor 203 exceeds or falls below a threshold value during the inserting operation (S105: judging step). In the first embodiment, the CPU 301 judges as to whether the detection value of force in the Z direction detected by the force sensor 203 is equal to or greater than the threshold value. When the detection value falls below the threshold value, there is no poor fit. When the detection value exceeds the threshold value, there is a poor fit, or the inserting operation is completed. The threshold value is set to an upper limit of the detection value detected when there is no poor fit. The threshold value can be obtained in advance by an experiment.

When the CPU 301 judges that the detection value falls below the threshold value (S105: No), the CPU 301 returns to the process of step S104 and continues the inserting operation.

When the CPU 301 judges that the detection value of force in the Z direction detected by the force sensor 203 exceeds the threshold value (S105: Yes), the CPU 301 judges as to whether the position of the robot hand 202 in the Z direction in the robot coordinate system Σ has reached a position of completion of the inserting operation (S106). The detection value of force in the Z direction detected by the force sensor 203 also exceeds the threshold value when the inserting operation is completed. Therefore, whether the detection value exceeds the threshold value due to the poor fit or due to the completion of the inserting operation is determined in step S106.

When the CPU 301 judges that the position of the robot hand 202 in the Z direction has reached the completion position (S106: Yes), i.e. when the inserting operation is completed, the CPU 301 controls the power source 500 to stop the vibration of the vibrators $240_1$, $240_2$ and $240_3$ (S107).

When the CPU 301 judges that the position of the robot hand 202 in the Z direction has not reached the completion position (S106: No), the CPU 301 changes the phases, the amplitudes and the frequencies of the vibrators $240_1$, $240_2$ and $240_3$ (S108: changing step). More specifically, the CPU 301 in step S108 controls the power source 500 to change at least one of the amplitudes, the frequencies and the phases of the vibrations of at least one of the vibrators $240_1$ to $240_3$, all of the vibrators $240_1$ to $240_3$ in the first embodiment. When the CPU 301 judges that the position of the robot hand 202 in the Z direction has not reached the completion position in step S106, the inserting operation is being performed, and the process of S108 is performed during the inserting operation.

The phase mode here is indicated by three parameters ($\theta_{m1}$, $\theta_{m2}$, $\theta_{m3}$). More specifically, the phase mode ($\theta_{m1}$, $\theta_{m2}$, $\theta_{m3}$) in the initial state is the first phase mode (0°, 120°, 240°) as described above.

In step S108, the phase mode ($\theta_{m1}$, $\theta_{m2}$, $\theta_{m3}$) is changed to eliminate the poor fit. Specifically, the CPU 301 changes the first phase mode (0°, 120°, 240°) to a second phase mode (0°, 0°, 0°) in which the phases of the vibrations of the vibrators 240₁ to 240₃ are the same. Setting the same phase for the vibrations of the vibrators 240₁ to 240₃ makes the deformation of the inserting object piece W1 greater than that in the first phase mode and increases the clearance between the inserting object piece W1 and the inserting target piece W2. Therefore, the poor fit is easily eliminated. Although it is most effective to change the mode to the second phase mode (0°, 0°, 0°), the phase of vibration (phase mode) may be arbitrarily changed. In this case, the vibration state of the inserting object piece W1 changes, and thus the poor fit is easily eliminated.

The change in the phase of vibration here denotes a relative change in a phase with respect to another phase. For example, at least one of the phases $\theta_{m2}$ and $\theta_{m3}$ is changed with respect to the phase $\theta_{m1}$.

In changing the amplitudes $V_{m1}$, $V_{m2}$ and $V_{m3}$ of the vibrations in step S108, the CPU 301 increases the amplitudes $V_{m1}$, $V_{m2}$ and $V_{m3}$ compared to before the change. Increasing the amplitudes of the vibrations can make the vibration force strong, and the poor fit is easily eliminated.

In changing the frequencies $f_{m1}$, $f_{m2}$ and $f_{m3}$ of the vibrations in step S108, the CPU 301 increases the frequencies $f_{m1}$, $f_{m2}$ and $f_{m3}$ compared to before the change. For example, the frequencies $f_{m1}$, $f_{m2}$ and $f_{m3}$ of the vibrations are changed from 10 [kHz] to ultrasonic vibration of 50 [kHz]. As a result, the inserting object piece W1 repeats expanding and contracting, and the clearance between the inserting object piece W1 and the inserting target piece W2 increases. There is an advantageous effect that the tilt of the central axes of the inserting object piece W1 and the inserting target piece W2 is corrected, and the poor fit is easily eliminated. The poor fit can be more effectively eliminated if the phases, the amplitudes and the frequencies are changed all at once, and the number of changes can be reduced.

After the process of step S108, the CPU 301 returns to the process of step S104 to continue the inserting operation.

According to the first embodiment, the vibrators 240₁, 240₂ and 240₃ contact the inserting object piece W1 when the plurality of fingers 220₁, 220₂ and 220₃ grasp the inserting object piece W1. Therefore, the vibration of the vibrators 240₁, 240₂ and 240₃ is efficiently transmitted to the inserting object piece W1. Therefore, the mass of the vibrators 240₁, 240₂ and 240₃ that provide the vibration can be reduced, and vibration sufficient to suppress or eliminate the poor fit can be provided without providing large vibration force. The vibration of the vibrators 240₁, 240₂ and 240₃ is controlled by the detection value of force in the Z direction detected by the force sensor 203, and thus the poor fit state can be effectively eliminated when the inserting object piece W1 poorly fits to the inserting target piece W2.

According to the first embodiment, the vibrators 240₁, 240₂ and 240₃ are vibrated before the start of the inserting operation when the inserting operation of the pieces W1 and W2 with a small clearance is carried out, and thus a poor fit that easily occurs during the inserting operation can be suppressed. More specifically, the vibration force is applied to the inserting object piece W1 before there is a poor fit, and thus the poor fit can be suppressed from the start of the inserting operation.

Even when there is a poor fit, there is an advantageous effect that at least one of the phases, the amplitudes and the frequencies of the vibrations of the vibrators 240₁ to 240₃ can be changed to eliminate the poor fit not only in a specific poor fit direction, but also for the whole circumference of the inserting object piece. The poor fit can be eliminated to continue the inserting operation, and thus the success rate of the inserting operation increases.

The number of stops of the robot apparatus 100 is reduced. This increases the operation rate of the robot apparatus 100 and increases the production per unit time.

An operation carried out for recovery, such as retracting the robot hand 202 and removing the inserting object piece W1, which is necessary when the inserting operation fails, is not necessary, and thus the burden of the user of the robot apparatus 100 is reduced.

Although it is judged "Yes" in step S105 when the detection value of force in the Z direction detected by the force sensor 203 is equal to the threshold value, the judgment of the boundary can be either way, and it may be judged "No" depending on the setting value of the threshold value.

[Second Embodiment]

Figure 6:
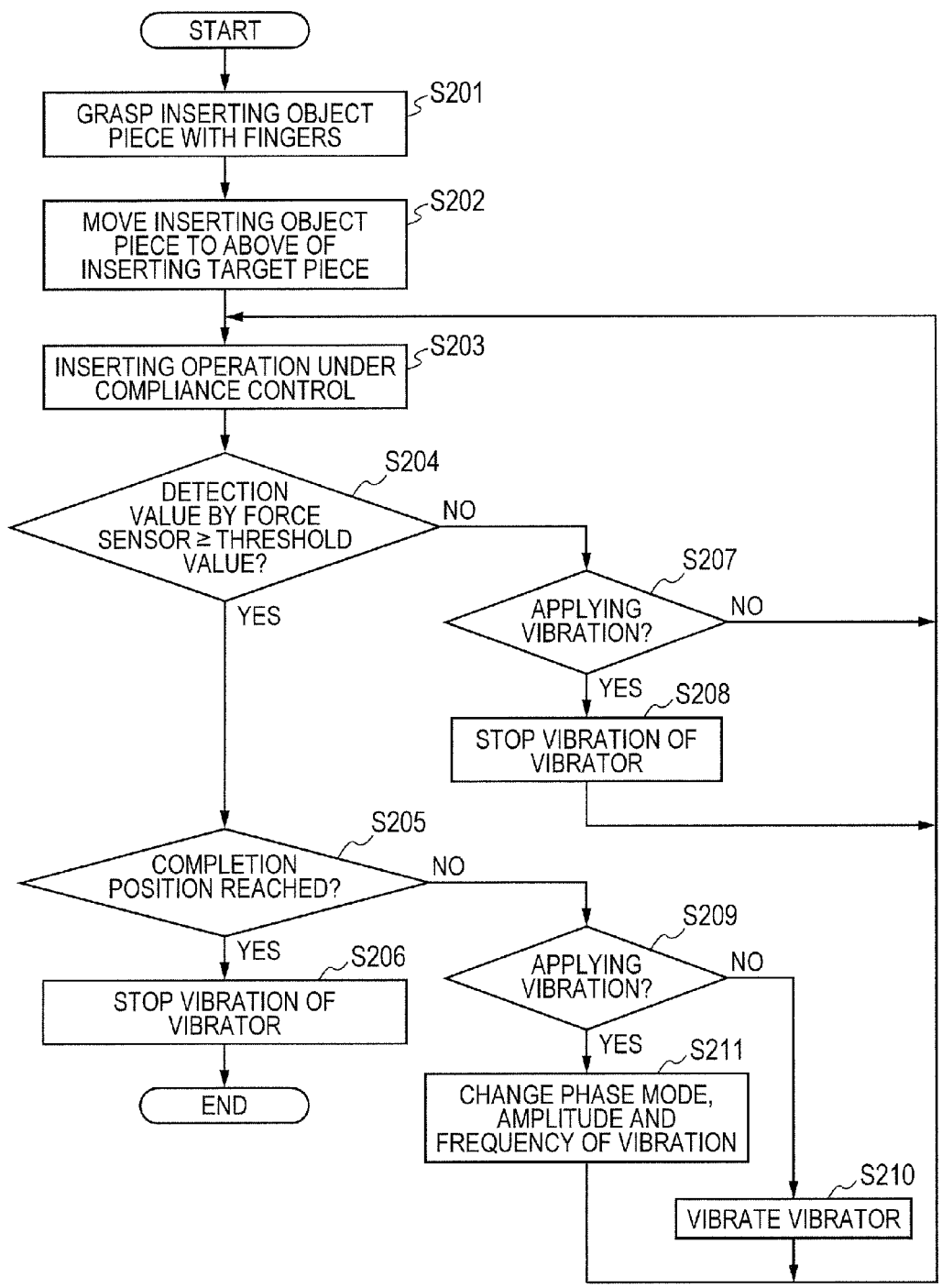
FIG. 6 is a flow chart illustrating a controlling method by a controlling apparatus of a robot apparatus according to a second embodiment.

A robot apparatus according to a second embodiment of the present invention will be described. FIG. 6 is a flow chart illustrating a controlling method by a controlling apparatus of the robot apparatus according to the second embodiment of the present invention. In the second embodiment, the same components as those of the first embodiment are designated with the same reference signs, and the description will not be repeated. The configuration of the robot apparatus of the second embodiment is the same as the configuration of the robot apparatus 100 of the first embodiment, and the content of the program 330 executed by the CPU 301 of the controlling apparatus 300 is different. Hereinafter, the steps of the controlling method will be described. The CPU 301 executes the steps illustrated in FIG. 6 according to the program 330.

The CPU 301 controls the drive of the fingers 220₁ to 220₃ of the robot hand 202 to cause the fingers 220₁ to 220₃ to grasp the inserting object piece W1 through the vibrators 240₁ to 240₃ (S201).

The CPU 301 controls the operation of the robot arm 201 to move the inserting object piece W1 grasped by the fingers 220₁ to 220₃ to above the inserting target piece W2 (S202). The position above the inserting target piece W2 is a position taught in advance by using the console panel 400 or the like so that the center position deviation between the inserting object piece W1 and the inserting target piece W2 is 0.1 [mm] or less. A taper can be provided to one of the inner periphery of the inserting object piece W1 and the outer periphery of the inserting target piece W2 to correct the position under the compliance control when the center position deviation is equal to or smaller than the taper size. The compliance control in the second embodiment is the same as the compliance control in the first embodiment.

The CPU 301 carries out an inserting operation (inserting action) under the compliance control (S203). In the first embodiment, vibration is applied to the inserting object piece W1 when there is no poor fit of the inserting object piece W1. Specifically, the vibration is applied to the inserting object piece W1 before the start of the inserting operation in the first embodiment. In the second embodiment, vibration is not applied to the inserting object piece W1, and the inserting operation is started only under the compliance control.

The CPU 301 judges as to whether a detection value of force in the Z direction detected by the force sensor 203 exceeds or falls below a threshold value during the inserting operation (S204: judging step). In the second embodiment, the CPU 301 judges as to whether the detection value of force in the Z direction detected by the force sensor 203 is equal to or greater than the threshold value. When the detection value falls below the threshold value, there is no poor fit. When the detection value exceeds the threshold value, there is a poor fit, or the inserting operation is completed. The threshold value is set to an upper limit of the detection value detected when there is no poor fit. The threshold value can be obtained in advance by an experiment and the like.

When the CPU 301 judges that the detection value of force in the Z direction detected by the force sensor 203 exceeds the threshold value (S204: Yes), the CPU 301 judges as to whether the position of the robot hand 202 in the Z direction in the robot coordinate system Σ has reached a position of completion of the inserting operation (S205). The detection value of force in the Z direction detected by the force sensor 203 also exceeds the threshold value when the inserting operation is completed. Therefore, whether the detection value exceeds the threshold value due to the poor fit or due to the completion of the inserting operation is determined in step S205.

When the CPU 301 judges that the position of the robot hand 202 in the Z direction has reached the completion position (S205: Yes), i.e. when the inserting operation is completed, the CPU 301 controls the power source 500 to stop the vibration of the vibrators $240_1$, $240_2$ and $240_3$ (S206).

When the CPU 301 judges that the detection value falls below the threshold value (S204: No), there is no poor fit, or the poor fit is eliminated. Therefore, the CPU 301 judges as to whether the vibrators $240_1$ to $240_3$ are vibrated (whether vibration is applied) (S207). When the vibration is applied (S207: Yes), the CPU 301 stops the vibration of the vibrators $240_1$ to $240_3$ (S208: vibration stopping step). When the vibration is not applied (S207: No), the CPU 301 returns to the process of step S203 to continue the inserting operation.

When the CPU 301 judges that the position of the robot hand 202 in the Z direction has not reached the completion position (S205: No), there is a poor fit. Therefore, the CPU 301 judges as to whether the vibrators $240_1$ to $240_3$ are vibrated (whether vibration is applied) (S209).

When the vibration is not applied (S209: No), the CPU 301 controls the power source 500 by transmitting a drive command to the power source 500 to start vibrating the vibrators $240_1$ to $240_3$ (S210: vibration starting step) and returns to step S203 to continue the inserting operation. Based on the drive command from the CPU 301, the power source 500 applies periodically changing driving voltage waveforms to the vibrators $240_1$ to $240_3$ to vibrate the vibrators $240_1$ to $240_3$. The waveforms of the driving voltages applied to the vibrators $240_1$ to $240_3$ are sine waves as in the first embodiment.

In this case, the frequencies $f_1$, $f_2$ and $f_3$ of the driving voltages provided to the vibrators $240_1$, $240_2$ and $240_3$ can be about 1 [kHz] to 10 [kHz] sufficiently larger than several dozen [Hz] that is a response frequency of the compliance control. In this way, the vibration force can be applied without affecting the compliance control of step S203. The vibration force is applied to the inserting object piece W1 by vibrating the vibrators $240_1$, $240_2$ and $240_3$.

The voltages for vibrating the vibrators $240_1$, $240_2$ and $240_3$ are applied to the vibrators $240_1$, $240_2$ and $240_3$ so that the sum of the amounts of expansion and contraction becomes 0 as in the first embodiment. Specifically, the phase mode ($\theta_1$, $\theta_2$, $\theta_3$) of the voltages is set to the first phase mode (0°, 120°, 240°) to set the phase mode ($\theta_{m1}$, $\theta_{m2}$, $\theta_{m3}$) of the vibrations to the first phase mode (0°, 120°, 240°). In the second embodiment, the amplitudes of the voltages are set to $V_1=V_2=V_3$ to set the amplitudes of the vibrations to $V_{m1}=V_{m2}=V_{m3}$, and the frequencies of the voltages are set to $f_1=f_2=f_3$ to set the frequencies of the vibrations to $f_{m1}=f_{m2}=f_{m3}$. As a result, the sum of the amounts of expansion and contraction of the vibrators $240_1$, $240_2$ and $240_3$ that change according to the applied voltages is set to 0.

In this way, the phases of the vibrations are shifted in the vibrators $240_1$, $240_2$ and $240_3$, and the outside diameter of the circle passing through the tips of the vibrators $240_1$, $240_2$ and $240_3$ illustrated by the dotted line in FIG. 5A does not change. Therefore, the vibration force can be applied to the inserting objection piece W1 while maintaining constant grasping force applied to the inserting object piece W1. As a result, the robot hand 202 can move the inserting object piece W1 without the fingers $220_1$, $220_2$ and $220_3$ dropping the inserting object piece W1 and without a deviation of the position for grasping the inserting object piece W1 when the vibration is applied to the inserting object piece W1.

When the vibration is applied (S209: Yes), the CPU 301 changes the phases, the amplitudes and the frequencies of the vibrators $240_1$, $240_2$ and $240_3$ (S211: changing step). More specifically, the CPU 301 in step S211 controls the power source 500 to change at least one of the amplitudes, the frequencies and the phases of the vibrations of at least one of the vibrators $240_1$ to $240_3$, all of the vibrators $240_1$ to $240_3$ in the second embodiment. When the CPU 301 judges that the position of the robot hand 202 in the Z direction has not reached the completion position in step S205, the inserting operation is being performed, and the process of S211 is performed during the inserting operation.

In step S211, the phase mode ($\theta_{m1}$, $\theta_{m2}$, $\theta_{m3}$) is changed to eliminate the poor fit. Specifically, the CPU 301 changes the first phase mode (0°, 120°, 240°) to the second phase mode (0°, 0°, 0°) in which the phases of the vibrations of the vibrators $240_1$ to $240_3$ are the same. Setting the same phase for the vibrations of the vibrators $240_1$ to $240_3$ makes the deformation of the inserting object piece W1 greater than that in the first phase mode and increases the clearance between the inserting object piece W1 and the inserting target piece W2. Therefore, the poor fit is easily eliminated. Although it is most effective to change the mode to the second phase mode (0°, 0°, 0°), the phase of vibration (phase mode) may be arbitrarily changed. In this case, the vibration state of the inserting object piece W1 changes, and thus the poor fit is easily eliminated.

The change in the phase of vibration here denotes a relative change in a phase with respect to another phase. For example, at least one of the phases $\theta_{m2}$ and $\theta_{m3}$ is relatively changed with respect to the phase $\theta_{m1}$.

In changing the amplitudes $V_{m1}$, $V_{m2}$ and $V_{m3}$ of the vibrations in step S211, the CPU 301 increases the amplitudes $V_{m1}$, $V_{m2}$ and $V_{m3}$ compared to before the change. Increasing the amplitudes of the vibrations can make the vibration force strong, and thus the poor fit is easily eliminated.

In changing the frequencies $f_{m1}$, $f_{m2}$ and $f_{m3}$ of the vibrations in step S211, the CPU 301 increases the frequencies $f_{m1}$, $f_{m2}$ and $f_{m3}$ compared to before the change. For example, the frequencies $f_{m1}$, $f_{m2}$ and $f_{m3}$ of the vibrations are changed from 10 [kHz] to ultrasonic vibration of 50 [kHz]. As a result, the inserting object piece W1 repeats expanding and contracting, and the clearance between the inserting object piece W1 and the inserting target piece W2 increases. There is an advantageous effect that the tilt of the central axes of the inserting object piece W1 and the inserting target piece W2 is corrected, and the poor fit is easily eliminated. The poor fit can be more effectively eliminated if the phases, the amplitudes and the frequencies are changed all at once, and thus the number of changes can be reduced.

After the process of step S211, the CPU 301 returns to the process of step S203 to continue the inserting operation under the compliance control.

According to the second embodiment, the vibrators $240_1$, $240_2$ and $240_3$ contact the inserting object piece W1 when the plurality of fingers $220_1$, $220_2$ and $220_3$ grasp the inserting object piece W1. Therefore, the vibration of the vibrators $240_1$, $240_2$ and $240_3$ is efficiently transmitted to the inserting object piece W1. Therefore, the mass of the vibrators $240_1$, $240_2$ and $240_3$ that provide the vibration can be reduced, and vibration sufficient to suppress or eliminate the poor fit can be provided without providing large vibration force. The vibration of the vibrators $240_1$, $240_2$ and $240_3$ is controlled by the detection value of force in the Z direction detected by the force sensor 203, and thus the poor fit state can be effectively eliminated when the inserting object piece W1 poorly fits to the inserting target piece W2.

According to the second embodiment, even when there is a poor fit in the inserting operation between the pieces W1 and W2 with a small clearance, the poor fit can be eliminated to continue the inserting operation, and the success rate of the inserting operation increases.

As in the first embodiment, the number of stops of the robot apparatus is reduced. This increases the operation rate of the robot apparatus and increases the production per unit time.

As in the first embodiment, an operation carried out for recovery, such as retracting the robot hand 202 and removing the inserting object piece W1, which is necessary when the inserting operation fails, is not necessary, and the burden of the user of the robot apparatus is reduced.

According to the second embodiment, the vibration can be applied to the inserting object piece W1 only when there is a poor fit, and the heat generation of the vibrators 240 can be suppressed when the inserting operation is repeatedly performed in a short time. Therefore, the robot apparatus can be continuously operated without using a unit for cooling.

Although it is judged "Yes" in step S204 when the detection value of force in the Z direction detected by the force sensor 203 is equal to the threshold value, the judgment of the boundary can be either way, and it may be judged "No" depending on the setting value of the threshold value.

[Third Embodiment]

Figure 7:
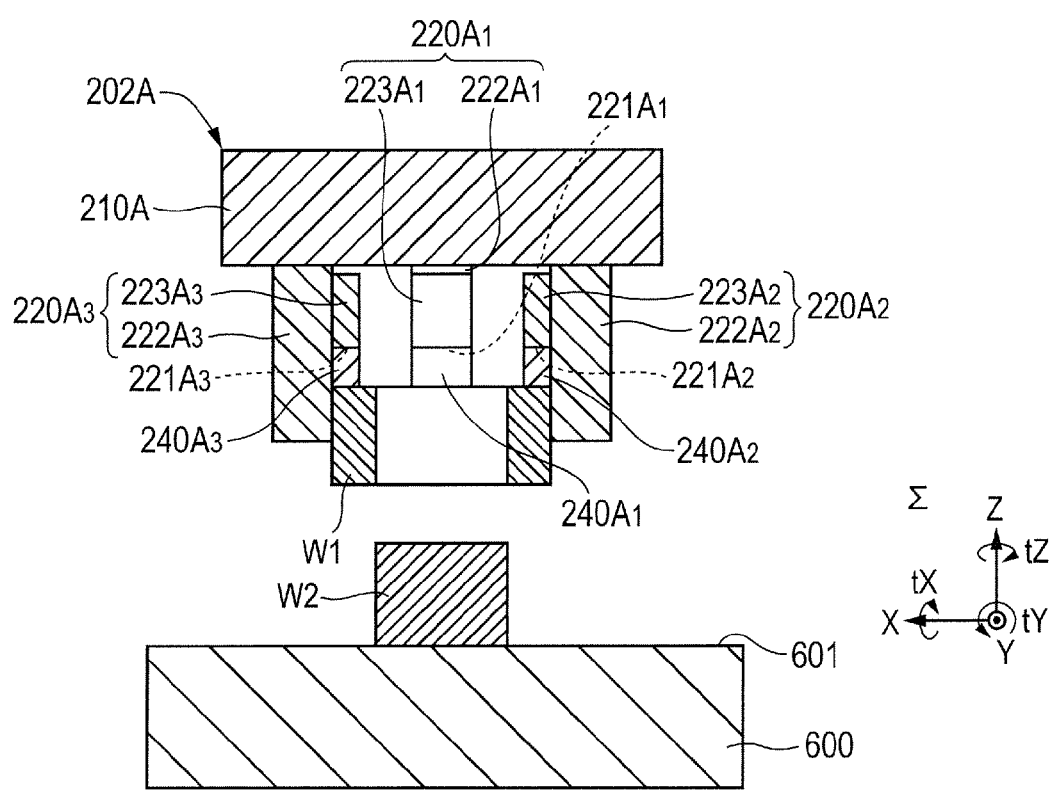
FIG. 7 is a cross-sectional schematic diagram illustrating a robot hand of the robot apparatus according to a third embodiment.

A robot apparatus according to a third embodiment of the present invention will be described. FIG. 7 is a cross-sectional schematic diagram illustrating a robot hand of the robot apparatus according to the third embodiment of the present invention. The configuration of the robot hand of the robot apparatus according to the third embodiment is different from that of the first and second embodiments, and the other configurations are the same as those of the first and second embodiments. The control operation of the controlling apparatus according to the third embodiment is the same as that of the first and second embodiments. In the third embodiment, the same components as those of the first and second embodiments are designated with the same reference signs, and the description will not be repeated.

A robot hand 202A includes: a hand body 210A; and a plurality of (three in the third embodiment) fingers $220A_1$, $220A_2$ and $220A_3$ arranged on the hand body 210A in a manner that the fingers $220A_1$, $220A_2$ and $220A_3$ can be opened and closed. The hand body 210A includes a driving unit not illustrated that drives the plurality of fingers $220A_1$, $220A_2$ and $220A_3$. The inserting object piece W1 can be grasped by a closing operation of the plurality of fingers $220A_1$, $220A_2$ and $220A_3$, and the grasping of the inserting object piece W1 can be released by an opening operation of the plurality of fingers $220A_1$, $220A_2$ and $220A_3$.

The plurality of fingers $220A_1$, $220A_2$ and $220A_3$ are arranged in a rotation symmetry at an angle (120° in the third embodiment) dividing 360° by the number of fingers around the central axis of the hand body 210A. Although the fingers $220A_1$, $220A_2$ and $220A_3$ are grasping nails without joints in the third embodiment, the fingers $220A_1$, $220A_2$ and $220A_3$ may include joints.

Vibrators $240A_1$, $240A_2$ and $240A_3$ as vibration bodies are attached to two or more of the plurality of fingers $220A_1$, $220A_2$ and $220A_3$, all of the fingers $220A_1$, $220A_2$ and $220A_3$ in the third embodiment.

The vibrators $240A_1$ to $240A_3$ are made of piezoelectric elements, fixed to the fingers $220A_1$ to $220A_3$, and connected to the power source 500 (see FIG. 1) through power lines not illustrated. Although it is effective to expose the vibrators $240A_1$ to $240A_3$ to the outside, the arrangement is not limited to this. The vibration bodies may include the vibrators $240A_1$ to $240A_3$ and covering members (protection members) such as rubber for protecting the vibrators $240A_1$ to $240A_3$.

The fingers $220A_1$ to $220A_3$ include step shaped portions $221A_1$ to $221A_3$ facing the grasped inserting object piece W1. Specifically, auxiliary members $223A_1$ to $223A_3$ forming the step shaped portions $221A_1$ to $221A_3$ are fixed to finger bodies $222A_1$ to $222A_3$ to form the fingers $220A_1$ to $220A_3$.

The vibrators $240A_1$ to $240A_3$ are provided at positions contacting the grasped inserting object piece W1. Specifically, the vibrators $240A_1$ to $240A_3$ are attached to the step shaped portions $221A_1$ to $221A_3$ of the fingers $220A_1$ to $220A_3$. In the third embodiment, the vibrators $240A_1$ to $240A_3$ are set at edges of the auxiliary members $223A_1$ to $223A_3$.

The vibration direction of the vibrators $240A_1$ to $240A_3$ is the inserting direction perpendicular to the grasping direction of the inserting object piece W1, i.e. the Z direction of the robot coordinate system Σ. Although the auxiliary members $223A_1$ to $223A_3$ that are members separate from the finger bodies $222A_1$ to $222A_3$ are attached to form the step shaped portions $221A_1$ to $221A_3$ in the third embodiment, the step shaped portions may be formed on the finger bodies $222A_1$ to $222A_3$.

According to the configuration, the vibration of the vibrators $240A_1$ to $240A_3$ can be efficiently transmitted to apply the vibration to the inserting object piece W1.

The present invention is not limited to the embodiments described above, and many changes can be made within the technical concept of the present invention.

The CPU 301 specifically executes the processing operations of the embodiments. Therefore, a recording medium recording a program for realizing the functions may be supplied to the controlling apparatus 300, and a computer (CPU or MPU) of the controlling apparatus 300 may read and execute the program stored in the recording medium to attain the functions. In this case, the program read from the recording medium realizes the functions of the embodiments, and the present invention includes the program and the recording medium recording the program.

The computer-readable recording medium is the HDD 304, and the program 330 is stored in the HDD 304 in the description of the embodiments. However, the arrangement is not limited to this. The program may be recorded in any recording medium as long as the recording medium is a computer-readable recording medium. For example, the ROM 302 and the recording disk 331 illustrated in FIG. 3 as well as an external storage device not illustrated may be used as a recording medium for supplying the program. Specifically, a flexible disk, a hard disk, an optical disk, a magneto-optical disk, a CD-ROM, a CD-R, a magnetic tape, a rewritable non-volatile memory (for example, USB memory) and a ROM can be used as a recording medium.

The program in the embodiments may be downloaded through a network, and the computer may execute the program.

The present invention is not limited to the case in which the computer executes read program codes to realize the functions of the embodiments. The present invention includes a case in which an OS (operating system) operating on the computer executes part or all of the actual processes based on instructions of the program codes to realize the functions of the embodiments through the processes.

The program codes read from the recording medium may be written in a memory included in one of a function expansion board inserted to the computer and a function expansion unit connected to the computer. The present invention includes a case in which a CPU included in one of the function expansion board and the function expansion unit executes part or all of the actual processes based on the instructions of the program codes to realize the functions of the embodiments through the processes.

Although the computer executes the program recorded in a recording medium, such as an HDD, to execute the image processing in the description of the embodiments, the arrangement is not limited to this. A dedicated LSI, such as ASIC and FPGA, may function as part or all of the operating units that operate based on the program. The ASIC is an acronym for Application Specific Integrated Circuit, and the FPGA is an acronym for Field-Programmable Gate Array.

According to the present invention, when the plurality of fingers grasp the inserting object piece, the vibrators contact the inserting object piece, and the vibration of the vibrators is efficiently transmitted to the inserting object piece. The vibration of the vibrators is controlled by the detection value by the force sensor, and thus the poor fit state can be effectively eliminated when the inserting object piece poorly fits to the inserting target piece.

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-040404, filed Mar. 3, 2014, which is hereby incorporated by reference herein in its entirety.

What is claimed is:

1. A robot apparatus comprising:
 a robot arm;
 a robot hand having a plurality of fingers for grasping a inserting object piece and being attached to the robot arm;
 a force sensor configured to detect a force exerted on the robot hand in a inserting direction to insert the inserting object piece to a inserting target piece;
 at least two vibrators respectively attached to two or more of the plurality of fingers, at a position so as to contact the inserting object piece;
 a driving source configured to vibrate each of the vibrators; and
 a controlling unit configured to control the robot arm and the robot hand, and to control the driving source, wherein
 the controlling unit:
 controls the driving source, to perform a inserting operation and to start a vibration of each of the vibrators; and
 judges as to whether a detecting value by the force sensor exceeds a threshold value or falls below the threshold value; and,
 when the controlling unit judges the detecting value by the force sensor exceeds the threshold value during the inserting operation, the controlling unit controls the driving source, to change at least one of an amplitude, a frequency and a phase of the vibration of at least one of the vibrators.

2. The robot apparatus according to claim 1, wherein, when the controlling unit starts the vibration of each vibrator, the controlling unit controls the driving source in a first phase mode such that phases of the respective vibrations of the vibrators have a phase difference acquired by equally dividing 360°.

3. The robot apparatus according to claim 2, wherein, in a case of changing the phase, the controlling unit changes from the first phase mode to a second phase mode such that the vibrators vibrate in the same phase.

4. The robot apparatus according to claim 3, wherein, in a case of changing the amplitude, the controlling unit controls the driving source to increase the amplitude.

5. The robot apparatus according to claim 4, wherein, in a case of
changing the frequency, the controlling unit controls the driving source to change the frequency higher.

6. A robot apparatus comprising:
a robot arm;
a robot hand having a plurality of fingers for grasping a inserting object piece and being attached to the robot arm;
a force sensor configured to detect a force exerted on the robot hand in a inserting direction to insert the inserting object piece to a inserting target piece;
at least two vibrators respectively attached to two or more of the plurality of fingers, at a position so as to contact the inserting object piece;
a driving source configured to vibrate two or more of the vibrators; and
a controlling unit configured to control the robot arm and the robot hand, and to control the driving source, wherein
the controlling unit:
judges as to whether a detecting value by the force sensor exceeds a threshold value or falls below the threshold value; and
when the controlling unit judges that the detecting value by the force sensor exceeds the threshold value, the controlling unit controls the driving source, to start the vibration of each of the vibrators.

7. The robot apparatus according to claim 6, wherein, when the controlling unit judges the detecting value by the force sensor exceeds the threshold value during an inserting operation under a state of vibrating each of the vibrators, the controlling unit controls the driving source, to change at least one of an amplitude, a frequency and a phase of the vibration of at least one of the vibrators.

8. The robot apparatus according to claim 6, wherein, when the controlling unit starts the vibration of each vibrator, the controlling unit controls the driving source in a phase mode such that phases of the respective vibrations of the vibrators have a phase difference acquired by equally dividing 360°.

9. The robot apparatus according to claim 6, wherein, when the controlling unit judges the detecting value by the force sensor falls below the threshold value during an inserting operation, the controlling unit controls the driving source, to stop the vibration of each of the vibrators.

10. The robot apparatus according to claim 1, wherein, when the inserting operation is completed, the controlling unit controls the driving source, to stop the vibration of each of the vibrators.

11. The robot apparatus according to claim 1, wherein the force sensor further detects a force in a direction crossing the inserting direction, and
the controlling unit feed-back controls an operation of the robot arm during the inserting operation, so as to make smaller a force component in the direction crossing the inserting direction detected by the force sensor.

12. The robot apparatus according to claim 1, wherein each of the vibrators is respectively attached to the corresponding finger at a grasping position for grasping the inserting object piece.

13. The robot apparatus according to claim 1, wherein each finger has a step shaped portion facing the inserting object piece, and
each of the vibrators is respectively attached to the corresponding step shaped portion.

14. The robot apparatus according to claim 6, wherein, when the inserting operation is completed, the controlling unit controls the driving source, to stop the vibration of each of the vibrators.

15. The robot apparatus according to claim 6, wherein the force sensor further detects a force in a direction crossing the inserting direction, and
the controlling unit feed-back controls an operation of the robot arm during the inserting operation, so as to make smaller a force component in the direction crossing the inserting direction detected by the force sensor.

16. The robot apparatus according to claim 6, wherein each of the vibrators is attached to the finger at a grasping position for grasping the inserting object piece.

17. The robot apparatus according to claim 6, wherein each finger has a step shaped portion facing the inserting object piece, and
each of the vibrators is respectively attached to the corresponding step shaped portion.

18. A controlling method of a robot apparatus, wherein the robot apparatus comprises:
a robot arm;
a robot hand having a plurality of fingers for grasping a inserting object piece and being attached to the robot arm;
a force sensor configured to detect a force exerted on the robot hand in a inserting direction to insert the inserting object piece to a inserting target piece;
at least two vibrators respectively attached to two or more of the plurality of fingers, at a position so as to contact the inserting object piece;
a driving source configured to vibrate each of the vibrators; and
a controlling unit configured to control the robot arm and the robot hand, and to control the driving source, wherein the controlling method comprises:
starting vibration controlling, by the controlling unit, to control the driving source, to perform a inserting operation and to start a vibration of each of the vibrators,
judging, by the controlling unit, as to whether a detecting value by the force sensor exceeds a threshold value or falls below the threshold value, and,
changing, by the controlling unit, such that, when the controlling unit judges the detecting value by the force sensor exceeds the threshold value during the inserting operation, the controlling unit controls the driving source, to change at least one of an amplitude, a frequency and a phase of the vibration of at least one of the vibrators.

19. A controlling method of a robot apparatus, wherein the robot apparatus comprises:
a robot arm;
a robot hand having a plurality of fingers for grasping a inserting object piece and being attached to the robot arm;
a force sensor configured to detect a force exerted on the robot hand in a inserting direction to insert the inserting object piece to a inserting target piece;
at least two vibrators respectively attached to two or more of the plurality of fingers, at a position so as to contact the inserting object piece;

a driving source configured to vibrate two or more of the vibrators; and a controlling unit configured to control the robot arm and the robot hand, and to control the driving source, wherein the controlling method comprises:

judging, by the controlling unit, as to whether a detecting value by the force sensor exceeds a threshold value or falls below the threshold value, and, when the controlling unit judges such that the detecting value by the force sensor exceeds the threshold value, controlling, by the controlling unit, the driving source, to start the vibration of each of the vibrators.

20. A non-transitory computer-readable recording medium storing a computer-executable program for causing a computer to execute a controlling method of a robot apparatus, wherein the robot apparatus comprises:

a robot arm;

a robot hand having a plurality of fingers for grasping a inserting object piece and being attached to the robot arm;

a force sensor configured to detect a force exerted on the robot hand in a inserting direction to insert the inserting object piece to a inserting target piece;

at least two vibrators respectively attached to two or more of the plurality of fingers, at a position so as to contact the inserting object piece;

a driving source configured to vibrate each of the vibrators; and a controlling unit configured to control the robot arm and the robot hand, and to control the driving source, wherein the controlling method comprises:

starting vibration controlling, by the controlling unit, to control the driving source, to perform a inserting operation and to start a vibration of each of the vibrators, judging, by the controlling unit, as to whether a detecting value by the force sensor exceeds a threshold value or falls below the threshold value, and, changing, by the controlling unit, such that, when the controlling unit judges the detecting value by the force sensor exceeds the threshold value during the inserting operation, the controlling unit controls the driving source, to change at least one of an amplitude, a frequency and a phase of the vibration of at least one of the vibrators.

21. A non-transitory computer-readable recording medium storing a computer-executable program for causing a computer to execute a controlling method of a robot apparatus, wherein the robot apparatus comprises:

a robot arm;

a robot hand having a plurality of fingers for grasping a inserting object piece and being attached to the robot arm;

a force sensor configured to detect a force exerted on the robot hand in a inserting direction to insert the inserting object piece to a inserting target piece;

at least two vibrators respectively attached to two or more of the plurality of fingers, at a position so as to contact the inserting object piece;

a driving source configured to vibrate two or more of the vibrators; and a controlling unit configured to control the robot arm and the robot hand, and to control the driving source, wherein the controlling method comprises;

judging, by the controlling unit, as to whether a detecting value by the force sensor exceeds a threshold value or falls below the threshold value, and, when the controlling unit judges that the detecting value by the force sensor exceeds the threshold value, controlling, by the controlling unit, the driving source, to start the vibration of each of the vibrators.

22. A robot apparatus comprising:

a robot arm;

a robot hand having a plurality of fingers for grasping an object and being attached to the robot arm;

a force sensor configured to detect a force exerted on the robot hand in a inserting direction to insert the object to an inserting target piece;

at least two vibrators respectively attached to each of at least two fingers among two or more of a plurality of fingers;

a driving source configured to vibrate each of the vibrators; and a controlling unit configured to control the robot arm and the robot hand, and to control the driving source, wherein the controlling unit:

controls the driving source, to start a vibration of each of the vibrators, and when the controlling unit judges the detecting value by the force sensor exceeds a threshold value during an inserting operation, the controlling unit controls the driving source, to change at least one of an amplitude, a frequency and a phase of the vibration of at least one of the vibrators.

23. The robot apparatus according to claim 22, wherein the force sensor is configured to obtain a force exerted on the robot hand.

24. The robot apparatus according to claim 22, wherein, when the force sensor detects the force exceeding the threshold value, the driving source changes the vibration of the vibrator.

25. The robot apparatus according to claim 22, wherein, when the controlling unit starts the vibration of each vibrator, the controlling unit controls the driving source in a first phase mode such that phases of the respective vibrations of the vibrators have a phase difference acquired by equally dividing 360°.

26. The robot apparatus according to claim 25, wherein, in a case of changing the phase, the controlling unit changes from the first phase mode to a second phase mode such that the vibrators vibrate in the same phase.

27. The robot apparatus according to claim 26, wherein, in a case of changing the amplitude, the controlling unit controls the driving source to increase the amplitude.

28. The robot apparatus according to claim 27, wherein, in a case of changing the frequency, the controlling unit controls the driving source to change the frequency higher.

* * * * *